United States Patent
Dong et al.

(10) Patent No.: US 11,415,410 B2
(45) Date of Patent: *Aug. 16, 2022

(54) METHOD AND APPARATUS OF OPTICAL MODULE ASSEMBLY

(71) Applicant: GOERTEK INC., Shandong (CN)

(72) Inventors: Nanjing Dong, Weifang (CN); Debo Sun, Weifang (CN)

(73) Assignee: GOERTEK INC., Weifang (CN)

( * ) Notice: Subject to any disclaimer, the term of this patent is extended or adjusted under 35 U.S.C. 154(b) by 272 days.

This patent is subject to a terminal disclaimer.

(21) Appl. No.: 16/652,361

(22) PCT Filed: Sep. 6, 2018

(86) PCT No.: PCT/CN2018/104390
§ 371 (c)(1),
(2) Date: Mar. 30, 2020

(87) PCT Pub. No.: WO2019/076162
PCT Pub. Date: Apr. 25, 2019

(65) Prior Publication Data
US 2020/0292837 A1 Sep. 17, 2020

(30) Foreign Application Priority Data

Oct. 17, 2017 (CN) .......................... 201710997441.7

(51) Int. Cl.
*G01B 11/27* (2006.01)
*G02B 7/00* (2021.01)
*G01M 11/02* (2006.01)

(52) U.S. Cl.
CPC ......... *G01B 11/27* (2013.01); *G01M 11/0221* (2013.01); *G02B 7/005* (2013.01)

(58) Field of Classification Search
CPC .. G02B 27/1073; G02B 27/123; G02B 27/62; G02B 7/003; G02B 7/004; G02B 7/005;
(Continued)

(56) References Cited

U.S. PATENT DOCUMENTS 3,528,748 A * 9/1970 Morriss .................. G01B 11/27
356/138
7,253,384 B2 * 8/2007 Barnes ................. G06K 7/1469
356/624

(Continued)

FOREIGN PATENT DOCUMENTS

CN 1685707 A 10/2005
CN 101493562 A 7/2009
(Continued)

*Primary Examiner* — Gordon J Stock, Jr.
(74) *Attorney, Agent, or Firm* — Maschoff Brennan

(57) ABSTRACT

Provided are a method and an apparatus of optical module assembly, where the method includes: when an optical module to be aligned images, controlling an alignment mechanism clamping a lens to be assembled to move in a set direction by a set movement step; when the alignment mechanism moves each time, collecting, by an image acquisition device, light spots imaged by the optical module to be aligned sequentially, and selecting a light spot with a minimum size from the collected light spots; determining an optimal position of the alignment mechanism according to at least two light spots before the light spot with the minimum size and at least two light spots thereafter; and controlling the alignment mechanism to move to the optimal position to align the lens to be assembled.

9 Claims, 6 Drawing Sheets

(58) Field of Classification Search
CPC .......... G02B 7/02; G02B 7/021; G02B 7/023;
G02B 7/04; G02B 7/08; G02B 7/09;
G01B 11/27; Y10T 29/49764; Y10T
29/49769; Y10T 29/49778; Y10T
29/4978; Y10T 29/49895; G06T 7/70;
G01M 11/0221; B23P 19/04; B23P 19/10
See application file for complete search history.

(56) References Cited

U.S. PATENT DOCUMENTS

| | | | | |
|---|---|---|---|---|
| 7,587,803 | B2* | 9/2009 | Montfort | H04N 5/2253 |
| | | | | 29/709 |
| 8,011,087 | B2* | 9/2011 | Hsiao | H04N 5/2257 |
| | | | | 29/832 |
| 9,009,952 | B2 | 4/2015 | Au et al. | |
| 11,077,530 | B2* | 8/2021 | Dong | B23P 21/004 |
| 11,079,221 | B2* | 8/2021 | Dong | G02B 7/025 |
| 11,253,962 | B2* | 2/2022 | Dong | G05B 19/41805 |
| 2005/0212951 | A1* | 9/2005 | Miyata | G02B 7/04 |
| | | | | 348/E5.045 |
| 2006/0042064 | A1* | 3/2006 | Montfort | H04N 5/2253 |
| | | | | 29/709 |
| 2009/0183365 | A1* | 7/2009 | Hsiao | G02B 7/02 |
| | | | | 29/836 |
| 2011/0075887 | A1* | 3/2011 | Tanaka | G02B 6/4221 |
| | | | | 156/64 |
| 2013/0047396 | A1 | 2/2013 | Au et al. | |
| 2020/0238455 | A1* | 7/2020 | Dong | G02B 7/023 |

FOREIGN PATENT DOCUMENTS

| | | | | |
|---|---|---|---|---|
| CN | 101592787 A | 12/2009 | | |
| CN | 201974587 U | 9/2011 | | |
| CN | 2906663 Y | 9/2014 | | |
| CN | 204989539 U | 1/2016 | | |
| CN | 105721753 A | 6/2016 | | |
| CN | 206339734 U | 7/2017 | | |
| CN | 107589514 A | 1/2018 | | |
| EP | 2495596 A2 * | 9/2012 | ............ | G02B 15/10 |
| WO | WO-2006028183 A1 * | 3/2006 | ........ | G02B 27/4255 |

* cited by examiner

METHOD AND APPARATUS OF OPTICAL MODULE ASSEMBLY

CROSS-REFERENCE TO RELATED APPLICATIONS

The present disclosure refers to Chinese Patent Application No. 201710997441.7, filed on Oct. 17, 2017, entitled "Method and Apparatus of Optical Module Assembly", which is hereby incorporated by reference in its entirety.

TECHNICAL FIELD

The present disclosure relates to the field of virtual reality technology, and in particular to a method and an apparatus of optical module assembly.

BACKGROUND

Nowadays, there are more and more optical modules with independent functions in the market to meet diversified market demands. These optical modules can be embedded in other devices to perform their functions, such as camera modules, miniature projection modules, LED (Light Emitting Diode, light emitting diode) optical modules, VR (Virtual Reality)/AR (Augmented Reality) optical modules and so on.

Generally, an optical module is assembled by a plurality of optical elements and other components. For example, the camera module can be assembled by components such as an image sensor, a lens base, a plurality of lenses, and a circuit board. Specifically, the assembly accuracy of the lens plays a decisive role in the optical performance of the optical module. In an optical module assembly method, the optical module images during the assembly process, and whether the lens to be assembled is aligned is determined according to the size of the imaging light spot, and the alignment of the lens to be assembled is continuously adjusted if the lens is not aligned.

However, how to adjust the lens to be assembled to the most rational position according to the size of the imaging light spot of the optical module during the assembly process is an urgent technical problem to be solved.

SUMMARY

Various aspects of the present disclosure provide a method and an apparatus of optical module assembly, which are used to adjust the lens to be assembled to the most rational position according to the size of light spots that are imaged by the optical module during assembly process, and the assembly accuracy of the optical module is improved thereby.

The present disclosure provides a method of optical module assembly, including:

when an optical module to be aligned images, controlling an alignment mechanism clamping a lens to be assembled to move in a set direction by a set movement step;

when the alignment mechanism moves each time, collecting, by an image acquisition device, light spots imaged by the optical module to be aligned sequentially, and selecting a light spot with a minimum size from the collected light spots;

determining an optimal position of the alignment mechanism according to at least two light spots before the light spot with the minimum size and at least two light spots thereafter; and controlling the alignment mechanism to move to the optimal position to align the lens to be assembled.

Further optionally, where the determining an optimal position of the alignment mechanism according to at least two light spots before the light spot with the minimum size and at least two light spots thereafter includes: establishing a coordinate system by taking a movement position of the alignment mechanism as a x-coordinate, and taking a size of the collected light spot as a y-coordinate; fitting a first straight line in the coordinate system according to the at least two light spots before the light spot with the minimum size and movement positions of the alignment mechanism when collecting the at least two light spots before the light spot with the minimum size, and fitting a second straight line in the coordinate system according to the at least two light spots thereafter and movement positions of the alignment mechanism when collecting the at least two light spots thereafter; and calculating an intersection point of the first straight line and the second straight line, and taking a value of the x-coordinate of the intersection point as the optimal position of the alignment mechanism.

Further optionally, where the selecting a light spot with a minimum size from the collected light spots includes: if sizes of a first number of light spots before a first light spot are all greater than a size of the first light spot, and if sizes of a second number of light spots after the first light spot are all less than the size of the first light spot, determining that the first light spot is the light spot with the minimum size.

Further optionally, where the controlling an alignment mechanism clamping a lens to be assembled to move in a set direction by a set movement step further includes: controlling the alignment mechanism to move from a beginning or an ending of an assembly area corresponding to the lens to be assembled in the set direction by the set movement step.

Further optionally, where before the determining an optimal position of the alignment mechanism according to at least two light spots before the light spot with the minimum size and at least two light spots thereafter further includes: taking a movement position of the alignment mechanism when the light spot with the minimum size is collected as a suspicion position; controlling the alignment mechanism to move to the suspicion position and movement positions of a set number before and after the suspicion position, and collecting, by the image acquisition device, light spots imaged by the optical module to be aligned when the alignment mechanism moves each time sequentially; and if in the light spots imaged by the optical module to be aligned when the alignment mechanism moves each time, the collected light spot is with the minimum size when the alignment mechanism moves to the suspicion position, determining that the light spot with the minimum size passes a repeated verification.

Further optionally, where before the optical module to be aligned imaging further includes: controlling the alignment mechanism to place the lens to be assembled at a specified position of an optical component to be assembled, to obtain the optical module to be aligned; and controlling a power supply component to supply power to an internal light source device of the optical module to be aligned or an external light source device located on an object side of the optical module to be aligned, so that the optical module to be aligned images.

The present disclosure further provides an apparatus of optical module assembly, including:

a movement module, configured to control an alignment mechanism clamping a lens to be assembled to move in a set direction by a movement step when an optical module to be aligned images;

an image acquisition module, configured to when the alignment mechanism moves each time, collect, by an image acquisition device, light spots imaged by the optical module to be aligned sequentially, and select a light spot with a minimum size from the collected light spots;

optimal position selecting module, configured to determine an optimal position of the alignment mechanism according to at least two light spots before the light spot with the minimum size and at least two light spots thereafter; and an alignment module, configured to control the alignment mechanism to move to the optimal position to align the lens to be assembled.

Further optionally, the optimal position selecting module is specifically configured to: establish a coordinate system by taking a movement position of the alignment mechanism as a x-coordinate, and taking a size of the collected light spot as a y-coordinate; fit a first straight line in the coordinate system according to the at least two light spots before the light spot with the minimum size and movement positions of the alignment mechanism when collecting the at least two light spots before the light spot with the minimum size, and fit a second straight line in the coordinate system according to the at least two light spots thereafter and movement positions of the alignment mechanism when collecting the at least two light spots thereafter; and calculate an intersection point of the first straight line and the second straight line, and take a value of the x-coordinate of the intersection point as the optimal position of the alignment mechanism.

Further optionally, the image acquisition module is specifically configured to: if sizes of a first number of light spots before a first light spot are all greater than a size of the first light spot, and if sizes of a second number of light spots after the first light spot are all less than the size of the first light spot, determine that the first light spot is the light spot with the minimum size.

Further optionally, the movement module is further configured to: control the alignment mechanism to move from a beginning or an ending of an assembly area corresponding to the lens to be assembled in the set direction by the set movement step.

Further optionally, the apparatus further including a minimum light spot verification module, where the minimum light spot verification module is configured to: take a movement position of the alignment mechanism when the light spot with the minimum size is collected as a suspicion position; control the alignment mechanism to move to the suspicion position and movement positions of a set number before and after the suspicion position, and collecting, by the image acquisition device, light spots imaged by the optical module to be aligned when the alignment mechanism moves each time sequentially; and if in the light spots imaged by the optical module to be aligned when the alignment mechanism moves each time, the collected light spot is with the minimum size when the alignment mechanism moves to the suspicion position, determine that the light spot with the minimum size passes a repeated verification.

Further optionally, the apparatus further including a pre-processing module, where the pre-processing module is configured to: control the alignment mechanism to place the lens to be assembled at a specified position of an optical component to be assembled, to obtain the optical module to be aligned; and control a power supply component to supply power to an internal light source device of the optical module to be aligned or an external light source device located on an object side of the optical module to be aligned, so that the optical module to be aligned images.

In the present disclosure, during the process of assembling the optical module, when the optical module to be aligned images, the alignment mechanism clamping the lens to be assembled is controlled to continuously move to find the imaged light spot with the minimum size, the optimal position of the alignment mechanism is determined based on at least two light spots before the light spot with the minimum size and at least two light spots thereafter, and the lens to be assembled is adjusted to the optimal position. Thereby, the search for the optimal position of the lens to be assembled is transformed into the search for the light spot with the minimum size imaged by the optical module to be assembled, which reduces the alignment difficulty of the lens to be assembled and improves the assembly accuracy of the optical module.

BRIEF DESCRIPTION OF THE DRAWINGS

In order to more clearly explain the embodiments of the present disclosure or the technical solutions in the prior art, the drawings used in the description of the embodiments or the prior art will be briefly introduced below. Obviously, the drawings in the following description are some embodiments of the present disclosure. For those of ordinary skill in the art, other drawings can be obtained based on these drawings without paying creative labor.

DETAILED DESCRIPTION OF EXAMPLE EMBODIMENTS

For making the purposes, technical solutions and advantages of the embodiments of the present disclosure clearer, the technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

It should be noted that, in the following embodiments of the present disclosure, the optical module refers to the completed product after the alignment is completed and is fixed; the optical module to be aligned refers to the optical module during the assembly process, which may be in an unaligned state or in an aligned state; the optical member to be assembled refers to the semi-finished product of the optical module, and the optical module can only be obtained after the lens to be assembled is aligned and assembled at its specified position and is fixed. The above-mentioned concepts mentioned below can be understood with reference to the above explanations, and will not be repeated.

In a method of optical module assembly, the optical module may image during the assembly process, and analyze whether the lens to be assembled is aligned according to the size of the imaged spot, and the lens to be assembled is continuously adjusted if it is not aligned. The core of the embodiment of the present disclosure is to provide a method for adjusting the position of the lens to be assembled to be optimal to obtain an optical module with high assembly accuracy. The technical solution proposed by the present disclosure will be specifically described below with reference to the drawings.

Figure 1:
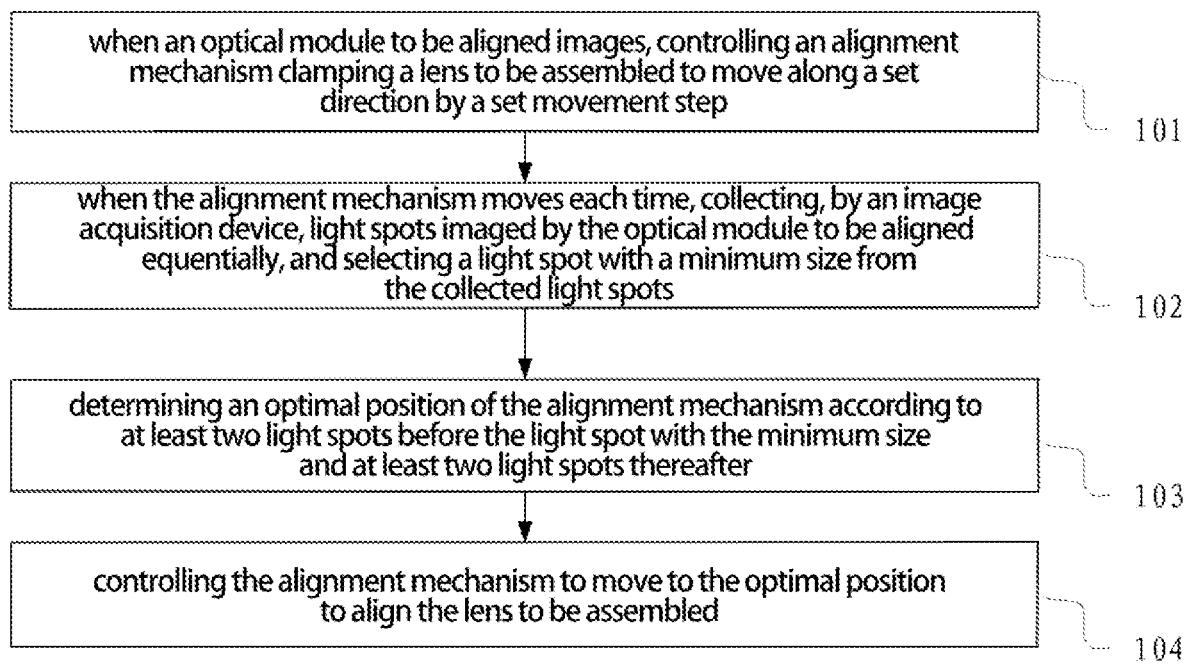
FIG. 1 is a method flowchart of a method of optical module assembly according to an embodiment of the present disclosure.

FIG. 1 is a method flowchart of a method of optical module assembly according to an embodiment of the present disclosure. In conjunction with FIG. 1, the method includes:

Step 101: when an optical module to be aligned images, controlling an alignment mechanism clamping a lens to be assembled to move in a set direction by a set movement step.

Step 102: when the alignment mechanism moves each time, collecting, by an image acquisition device, light spots imaged by the optical module to be aligned sequentially, and selecting a light spot with a minimum size from the collected light spots.

Step 103: determining an optimal position of the alignment mechanism according to at least two light spots before the light spot with the minimum size and at least two light spots thereafter.

Step 104: controlling the alignment mechanism to move to the optimal position to align the lens to be assembled.

In step 101, the alignment mechanism generally includes a mechanical arm and an alignment head located on the mechanical arm. The mechanical arm is used for moving according to the set motion trajectory, and the alignment head may be a vacuum holding member or a mechanical jig for clamping the lens to be assembled.

The optical module to be aligned includes the optical component to be assembled and the lens to be assembled. The alignment mechanism may place the lens to be assembled at a specified position of the optical component to be assembled, but the specified position may not make the optical module achieve the best optical performance. Therefore, the alignment mechanism may carry the lens to be assembled and continuously move the lens to be assembled near a specified position to adjust the lens to be assembled to an optimal position. It should be understood that the optimal position may optimize the optical performance of the optical module.

When the alignment mechanism carries the lens to be assembled and moves continuously, the alignment mechanism may be set to move in the set movement direction by the set movement step, in order to find the possible rule of the result brought by its movement. Optionally, the set movement step may be a movement distance corresponding to each movement, for example, 2 mm; the movement direction may be a forward direction or a backward direction, etc.

In step 102, when the alignment mechanism moves each time, the position of the lens to be assembled clamped by the alignment mechanism changes, so the light spot imaged by the optical module to be assembled also changes accordingly. In the present embodiment, when the alignment mechanism moves to a movement position each time, the light spot imaged by the optical module to be assembled at this time is recorded, and the corresponding relationship between the light spot and the movement position is recorded.

After multiple movements of the alignment mechanism, the image acquisition device will collect multiple light spots of different sizes. According to the principle of optical imaging, the smaller the spot size, the more concentrated the light energy, the clearer the imaging, and the better the performance of the assembled optical module. Therefore, a light spot with a minimum size may be found in advance from a plurality of light spots with different sizes collected by the image acquisition device, and an optimal movement position of the alignment mechanism may be found according to the light spot with the minimum size.

In step 103, during the process in which the alignment mechanism moves in a set direction by a set movement step, the image acquisition device sequentially collects the light spots to be imaged by the optical module to be aligned with the movement of the alignment mechanism. There is a certain order of the collected light spots, and the order has a corresponding relationship with the movement position of the alignment mechanism.

At least two light spots before the light spot with the minimum size refer to at least two of the light spots collected before the light spot with the minimum size is collected, and at least two light spots after the light spot with the minimum size refer to at least two of the light spots collected after the light spot with the minimum size is collected. For example, the image acquisition device collects a total of 10 light spots P1-P10. If the fifth light spot P5 is the light spot with the minimum size, at least two light spots before the light spot with the minimum size may be selected from P1-P4, and at least two light spots after the light spot with the minimum size may be selected from P6-P10.

After acquiring at least two light spots before the light spot with the minimum size and at least two light spots thereafter, the optimal position of the alignment mechanism may be determined. The optimal position of the alignment mechanism may be considered as the target movement position of the alignment mechanism. When the alignment mechanism moves to this position, the lens to be assembled clamped by the alignment mechanism may be aligned with the optical component to be assembled.

In step 104, after the optimal position is determined, the alignment mechanism may be controlled to move to the optimal position, thereby achieving the alignment of the lenses to be assembled.

In the present embodiment, during the process of assembling the optical module, when the optical module to be aligned images, the alignment mechanism clamping the lens to be assembled is controlled to continuously move to find the imaged light spot with the minimum size, the optimal position of the alignment mechanism is determined based on at least two light spots before the light spot with the minimum size and at least two light spots thereafter, and the lens to be assembled is adjusted to the optimal position. Thereby, the search for the optimal position of the lens to be assembled is transformed into the search for the light spot with the minimum size imaged by the optical module to be assembled, which reduces the alignment difficulty of the lens to be assembled and improves the assembly accuracy of the optical module.

Figure 2A:
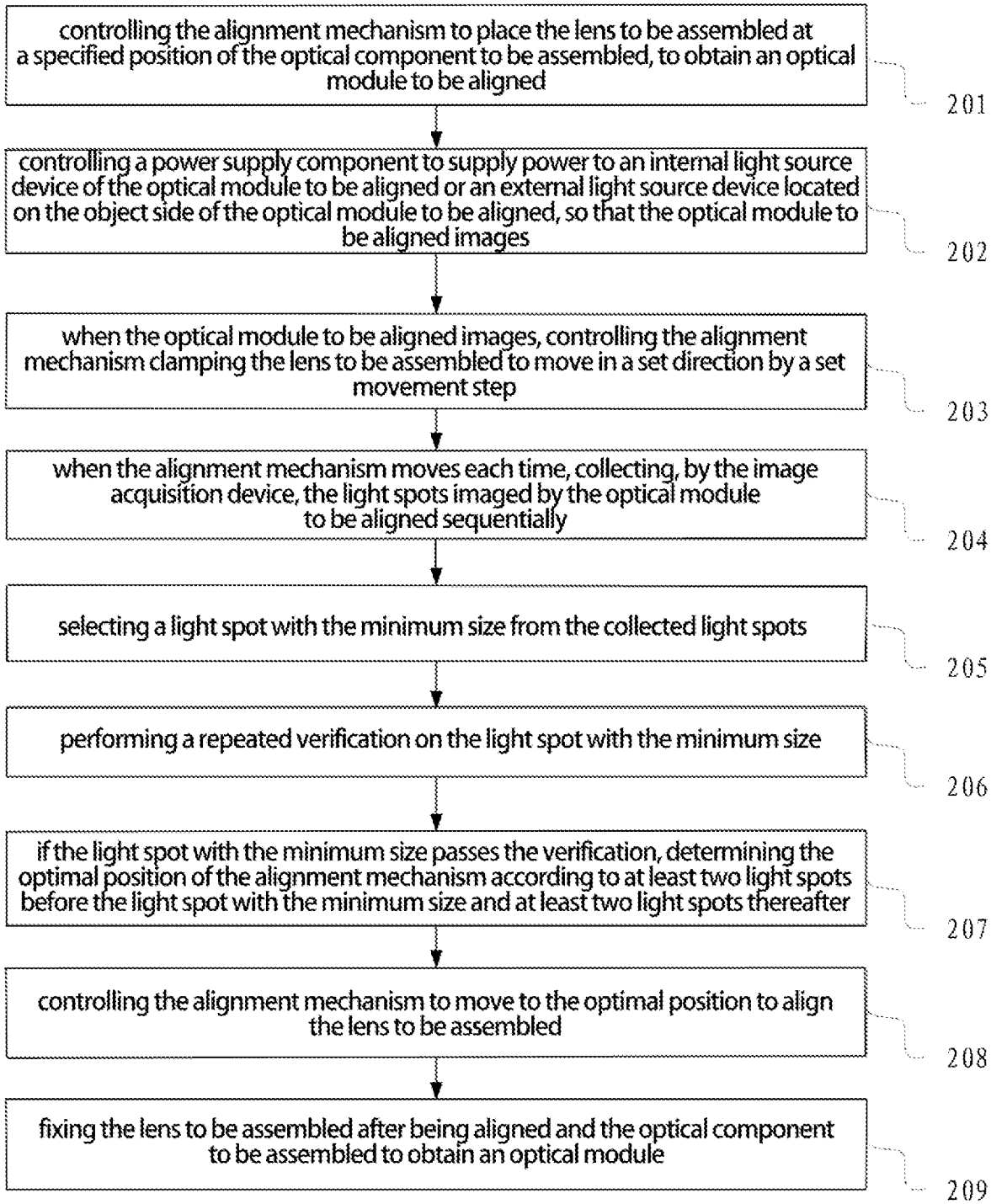
FIG. 2a is a method flowchart of a method of optical module assembly according to another embodiment of the present disclosure.

FIG. 2a is a method flowchart of a method of optical module assembly according to another embodiment of the present disclosure. In conjunction with FIG. 2a, the method includes:

Step 201: controlling the alignment mechanism to place the lens to be assembled at a specified position of the optical component to be assembled, to obtain an optical module to be aligned.

Step 202: controlling a power supply component to supply power to an internal light source device of the optical module to be aligned or an external light source device located on the object side of the optical module to be aligned, so that the optical module to be aligned images.

Step 203: when the optical module to be aligned images, controlling the alignment mechanism clamping the lens to be assembled to move in a set direction by a set movement step.

Step 204: when the alignment mechanism moves each time, collecting, by the image acquisition device, the light spots imaged by the optical module to be aligned sequentially.

Step 205: selecting a light spot with the minimum size from the collected light spots.

Step 206: performing a repeated verification on the light spot with the minimum size.

Step 207: if the light spot with the minimum size passes the verification, determining the optimal position of the alignment mechanism according to at least two light spots before the light spot with the minimum size and at least two light spots thereafter.

Step 208: controlling the alignment mechanism to move to the optimal position to align the lens to be assembled.

Step 209: fixing the lens to be assembled after being aligned and the optical component to be assembled to obtain an optical module.

In step 201, the optical component to be assembled is usually fixed on the fixing component, and its position accuracy may be determined by the fixing component. The specified position may be a position calculated according to the hardware parameters of the optical component and lens to be assembled and the optical performance requirements of the optical module, but the specified position may not be the position that allows the optical module to achieve the best optical performance.

In step 202, in the present embodiment, the alignment of the lens to be assembled may be achieved according to the actual imaging effect of the optical module to be aligned. Therefore, during the alignment process, the optical module to be aligned needs to image.

Optionally, in some optical modules, such as a microprojection module, a light source device is built therein, and the power source component may supply power to these light source devices to make the optical module to be aligned images. In other optical modules, such as a camera module, there is no light source device inside. An external light source device may be provided on the object side of the optical module to be aligned. The power supply component may supply power to these light source devices to make the optical module to be aligned image.

In step 203, optionally, in order not to miss the other possible optimal positions, the alignment mechanism may move from the beginning or ending of the assembly area corresponding to the lens to be assembled in a set direction by a set movement step. The assembly area corresponding to the lens to be assembled may be an area near the specified position described in step 201, for example, an area of ±5 mm near the specified position. Then, the movement of the alignment mechanism may start from 5 mm in front of the specified position or start from 5 mm behind the specified position in the set direction by the set movement step.

In step 204, for each movement of the alignment mechanism, the image acquisition device may be controlled to sequentially collect the light spots imaged by the optical module to be aligned.

Figure 2B:
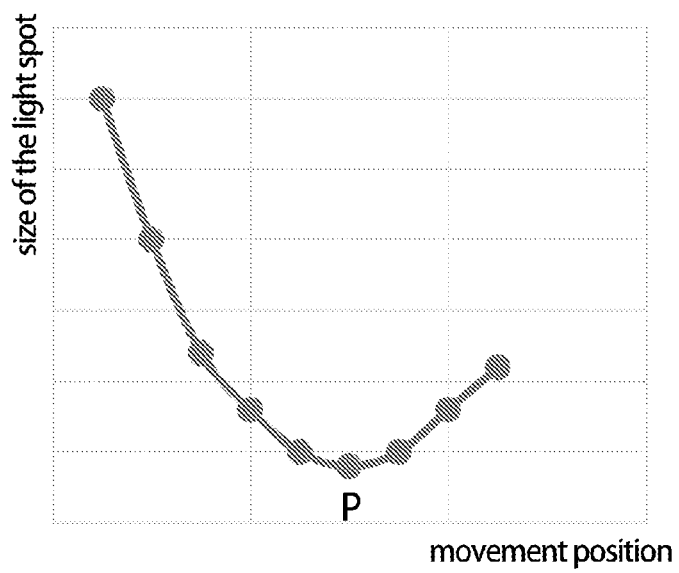
FIG. 2b is a schematic diagram of selecting a light spot with the minimum size according to the present disclosure.
Figure 2C:
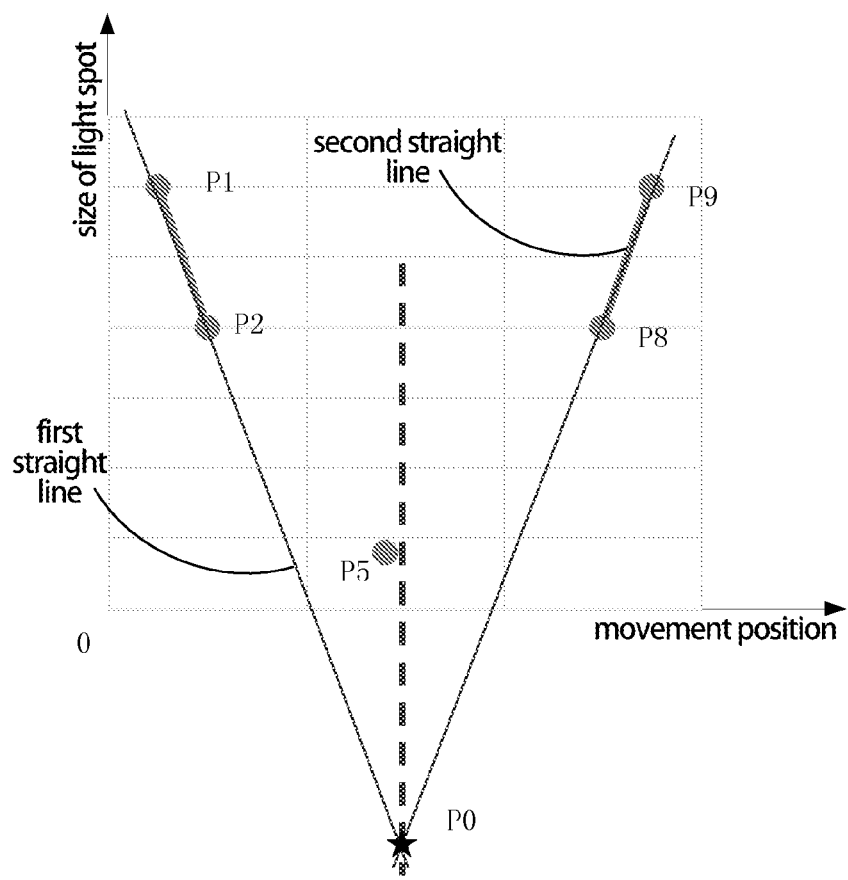
FIG. 2c is a schematic diagram of selecting an optimal position according to the present disclosure.

In step 205, when the alignment mechanism moves a plurality of times, the image acquisition device may collect a plurality of light spots. Optionally, a first light spot that meets a set condition is found as the light spot with the minimum size among the plurality of light spots. The set condition is:

The sizes of a first number of light spots before a first light spot are all greater than a size of the first light spot, and the sizes of a second number of light spots after the first light spot are all less than the size of the first light spot. The first light spot refers to a light spot that satisfies the set condition. The "first" is merely for the convenience of expression of the light spot, and the order of collecting the light spots is not limited. The first number and the second number may be equal to or different from each other. Generally, the first number is determined by actual movement condition, and the second number may be 1-5, which is not limited in the embodiment of the present disclosure. Taking the light spot P shown in FIG. 2b as an example, the five light spots before the light spot P are larger than the light spot P, and the three light spots after the light spot P are larger than the light spot P. Therefore, the light spot P may be regarded as the light spot with the minimum size.

It should be noted that, in an optional implementation manner, when the second number of light spots may determine that the first light spot is the light spot with the minimum size, the alignment mechanism may no longer continue to move in the set direction, thereby efficiency regarding finding the light spot with the minimum size is increased.

In step 206, after determining the light spot with the minimum size, to ensure accuracy, the light spot with the minimum size may be repeatedly checked. Optionally, when the calibration is repeated, the movement position of the alignment mechanism when the light spot with the minimum size is collected may be used as the suspicion position, the alignment mechanism is controlled to move to the suspicion position and a set number of movement positions before and after the suspicion position, and the light spots imaged by the optical module to be aligned when the alignment mechanism moves each time sequentially. The set number may be selected according to the actual situation, which is not limited in the embodiment of the present disclosure.

In step 207, if the size of the light spot collected when the alignment mechanism moves to a suspicion position is still the smallest among the light spots collected in each movement, the light spot with the minimum size passes the verification and may be determined that the light spot with the minimum size has been accurately collected.

Figure 3A:
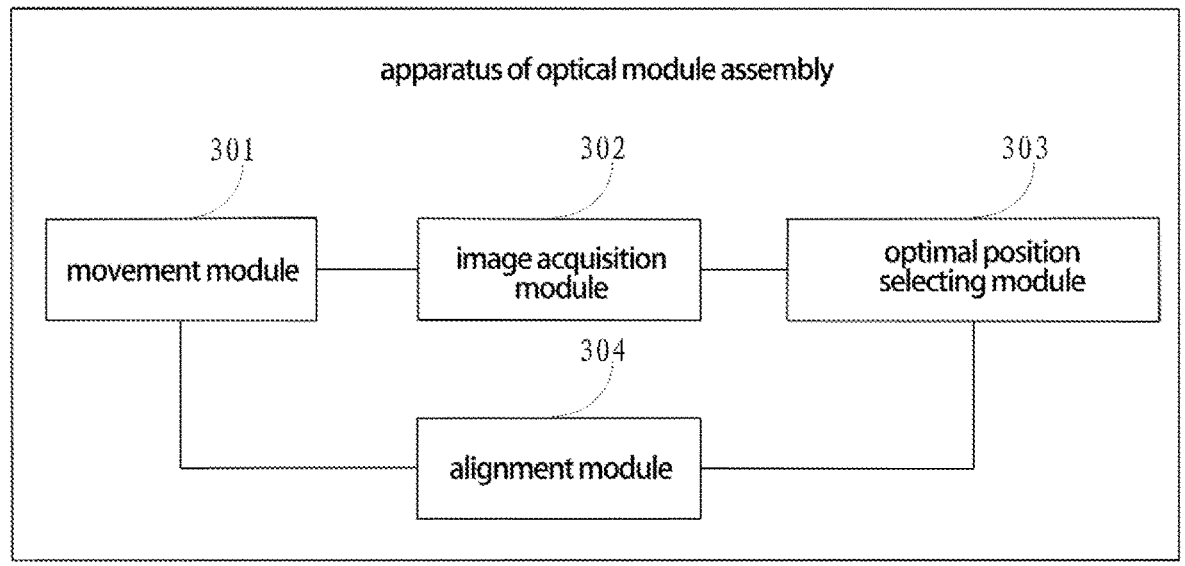
FIG. 3a is a schematic structural diagram of an apparatus of optical module assembly according to an embodiment of the present disclosure.
Figure 3B:
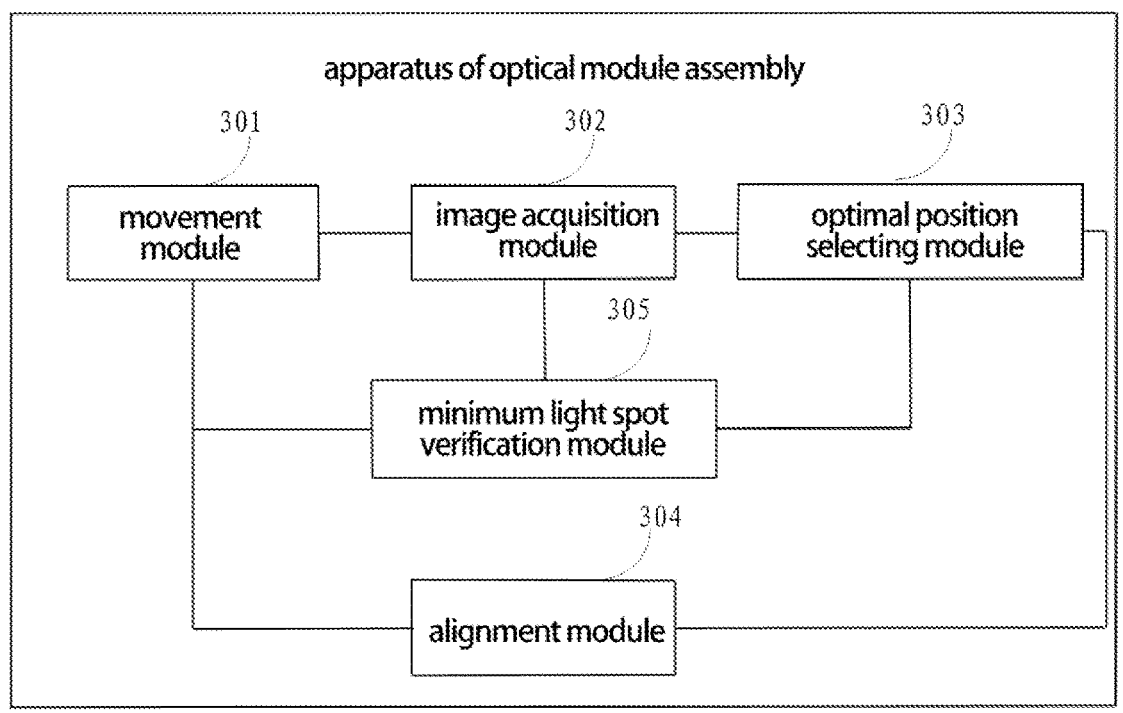
FIG. 3b is a schematic structural diagram of an apparatus of optical module assembly according to another embodiment of the present disclosure.
Figure 3C:
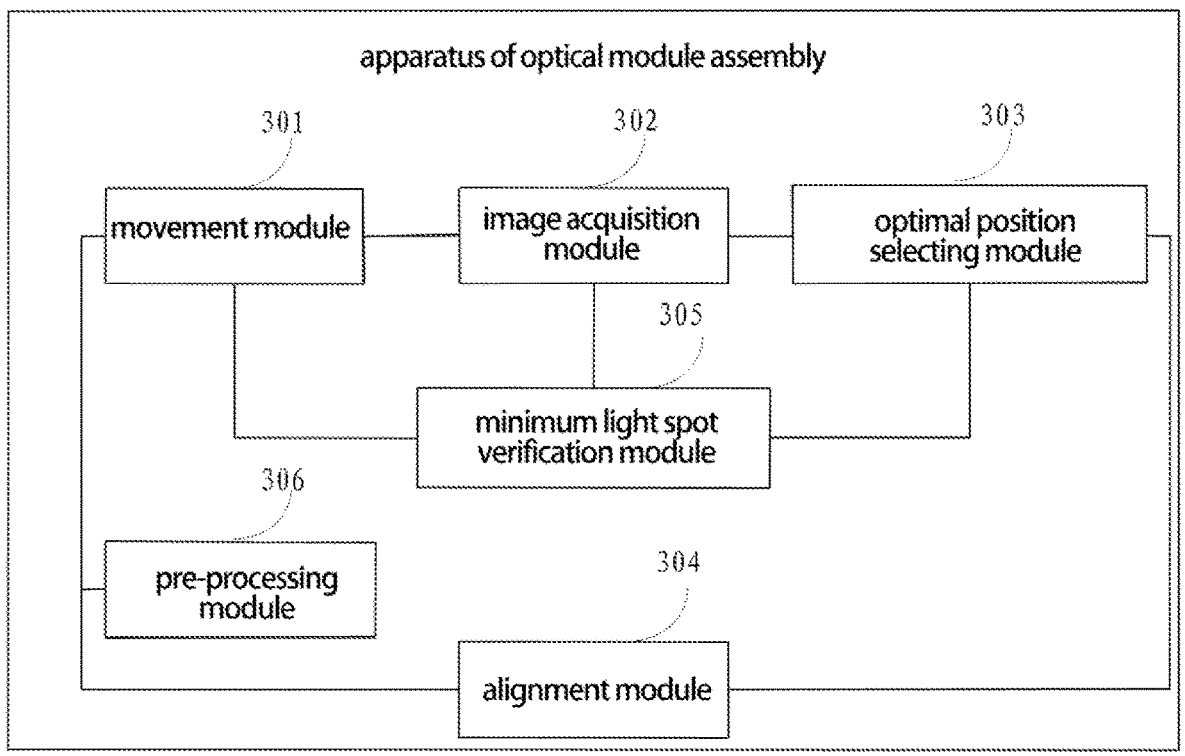
FIG. 3c is a schematic structural diagram of an apparatus of optical module assembly according to still another embodiment of the present disclosure.
Figure 4:
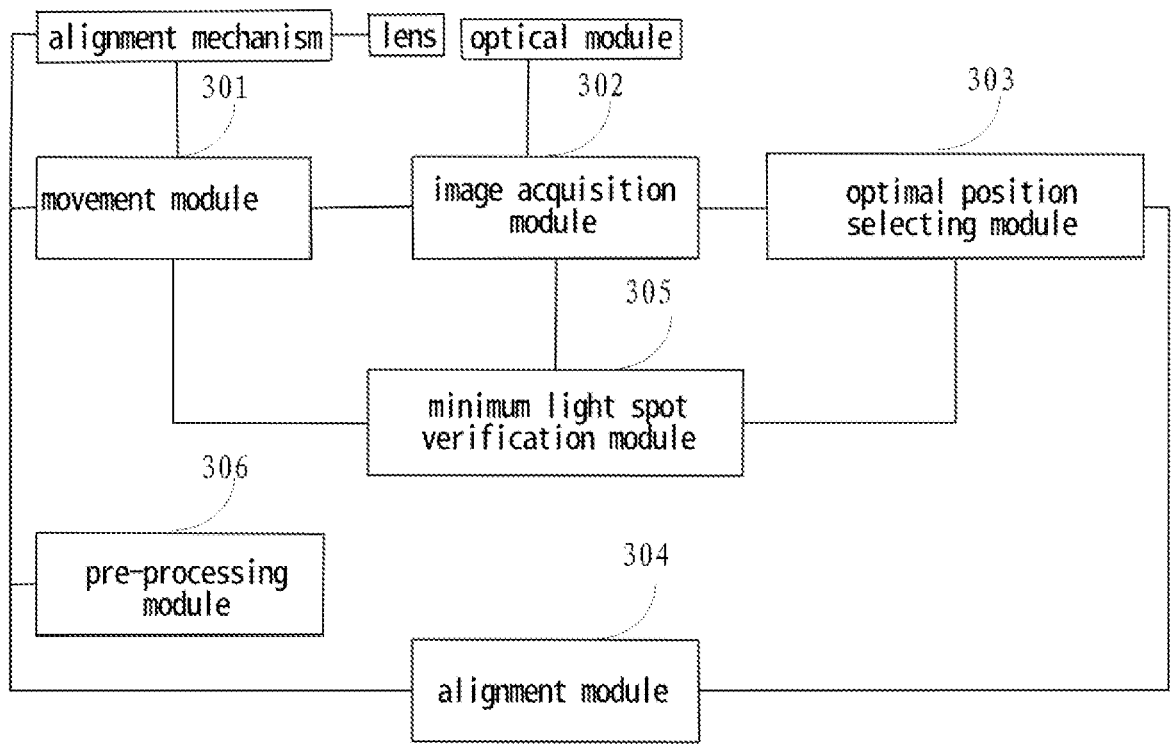
FIG. 4 is a schematic structural diagram of an apparatus of optical module assembly according to still another embodiment of the present disclosure.
Figure 5:
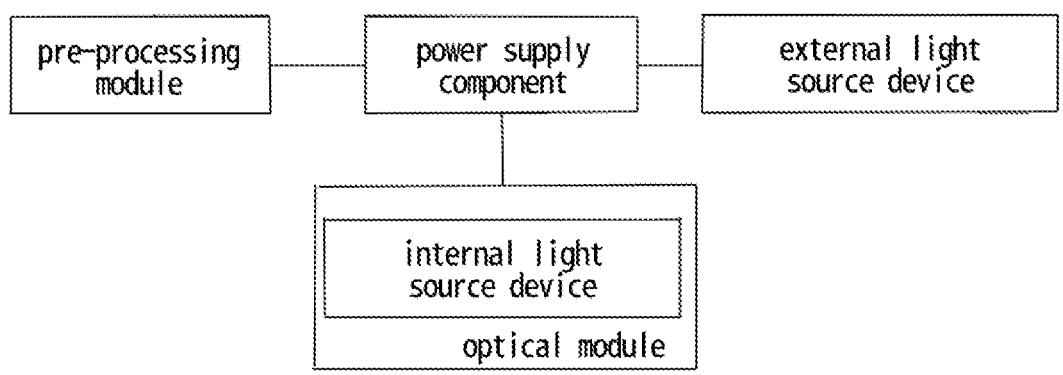
FIG. 5 is a schematic structural diagram of an apparatus of optical module assembly according to still another embodiment of the present disclosure.

Optionally, in the present embodiment, the determining the optimal position of the alignment mechanism according to at least two light spots before the light spot with the minimum size and at least two light spots thereafter may be implemented in the following manner:

First, the movement position of the alignment mechanism may be set as the x-coordinate, and the size of the collected light spot may be set as the y-coordinate to establish a coordinate system as shown in FIG. 3c.

Second, a first straight line may be fitted in the coordinate system according to at least two light spots before the light spot with the minimum size and the movement positions of the alignment mechanism when collecting the at least two light spots before the light spot with the minimum size, and a second straight line may be fitted in the coordinate system according to the at least two light spots thereafter and movement positions of the alignment mechanism when collecting the at least two light spots thereafter.

Next, an intersection point of the first straight line and the second straight line is calculated, and a value of the x-coordinate of the intersection point is taken as the optimal position of the alignment mechanism.

As shown in FIG. 3c, it is assumed that the image acquisition device collects a total of nine light spots P1-P9, and the fifth light spot P5 is the light spot with the minimum size. P1 and P2 are selected from the light spots before P5, and the first straight line shown in FIG. 3c is fitted according to the x-coordinates and y-coordinates corresponding to P1 and P2. P8 and P9 are selected from the light spots after P5, and the second straight line shown in FIG. 3c is fitted according to x-coordinates and y-coordinates corresponding to P8 and P9. The first straight line and the second straight line may intersect at the P0 point shown in FIG. 3c. At this time, the value corresponding to the x-coordinate corresponding to the P0 point may be used as the optimal position of the alignment mechanism.

It can be seen from FIG. 3c that the x-coordinate corresponding to the light spot with the minimum size is not necessarily the optimal position of the alignment mechanism, which is caused by the limitation of the movement step size and the accuracy of the alignment mechanism. The method for determining the optimal position of the alignment mechanism provided in the present embodiment overcomes the above defects and improves the alignment accuracy of the lens to be assembled.

In step 208, after the optimal position is determined, the alignment mechanism is controlled to move to the optimal position to align the lens to be assembled.

In step 209, after the lens to be assembled is aligned, the lens to be assembled after being aligned and the optical component to be assembled may be fixed to obtain the optical module.

Optionally, before the lens to be assembled is aligned, the glue may be dispensed at a specific position of the optical component to be assembled in advance, and then the glue may be directly cured after the alignment to achieve the purpose of fixing the lens to be assembled and the optical component to be assembled. Optionally, after the lens to be assembled is aligned, glue may be dispensed and cured at a specific position of the optical component to be assembled and or lens to be assembled to achieve the purpose of fixing the lens to be assembled and the optical component to be assembled.

Optionally, in the present embodiment, UV (Ultraviolet Rays) glue, that is, shadowless glue, also known as photosensitive glue or ultraviolet curing glue, has high adhesion and rapid curing, which may indirectly improve the assembly effectiveness of optical module. In the curing stage, a UV lamp may be used to irradiate the dispensing area to further accelerate the curing speed.

In the present embodiment, during the process of assembling the optical module, when the optical module to be aligned images, the alignment mechanism clamping the lens to be assembled is controlled to continuously move to find the imaged light spot with the minimum size, the optimal position of the alignment mechanism is determined based on at least two light spots before the light spot with the minimum size and at least two light spots thereafter, and the lens to be assembled is adjusted to the optimal position. Thereby, the search for the optimal position of the lens to be assembled is transformed into the search for the light spot with the minimum size imaged by the optical module to be assembled, which reduces the alignment difficulty of the lens to be assembled and improves the assembly accuracy of the optical module.

FIG. 3a is a schematic structural diagram of an apparatus of optical module assembly according to an embodiment of the present disclosure. In conjunction with FIG. 3a, the apparatus includes:

A movement module 301, configured to an alignment mechanism clamping a lens to be assembled to move in a set direction by a movement step when an optical module to be aligned images.

An image acquisition module 302, configured to when the alignment mechanism moves each time, collect, by an image acquisition device, light spots imaged by the optical module to be aligned sequentially, and select a light spot with a minimum size from the collected light spots.

An optimal position selecting module 303, configured to determine an optimal position of the alignment mechanism according to at least two light spots before the light spot with the minimum size and at least two light spots thereafter.

An alignment module 304, configured to control the alignment mechanism to move to the optimal position to align the lens to be assembled.

Further optionally, the optimal position selecting module 303 is specifically configured to establish a coordinate system by taking a movement position of the alignment mechanism as a x-coordinate, and taking a size of the collected light spot as a y-coordinate; fit a first straight line in the coordinate system according to the at least two light spots before the light spot with the minimum size and movement positions of the alignment mechanism when collecting the at least two light spots before the light spot with the minimum size, and fit a second straight line in the coordinate system according to the at least two light spots thereafter and movement positions of the alignment mechanism when collecting the at least two light spots thereafter; and calculate an intersection point of the first straight line and the second straight line, and take a value of the x-coordinate of the intersection point as the optimal position of the alignment mechanism.

Further optionally, the image acquisition module 302 is specifically configured to: if sizes of a first number of light spots before a first light spot are all greater than a size of the first light spot, and if sizes of a second number of light spots after the first light spot are all less than the size of the first light spot, determine that the first light spot is the light spot with the minimum size.

Further optionally, the movement module 301 is further configured to control the alignment mechanism to move from a beginning or an ending of an assembly area corresponding to the lens to be assembled in the set direction by the set movement step.

Further optionally, as shown in FIG. 3b, the apparatus further includes a minimum light spot verification module 305, where the minimum light spot verification module 305 is configured to: take a movement position of the alignment mechanism when the light spot with the minimum size is collected as a suspicion position; control the alignment mechanism to move to the suspicion position and movement positions of a set number before and after the suspicion position, and collecting, by the image acquisition device, light spots imaged by the optical module to be aligned when the alignment mechanism moves each time sequentially; and if in the light spots imaged by the optical module to be aligned when the alignment mechanism moves each time, the collected light spot is with the minimum size when the alignment mechanism moves to the suspicion position, determine that the light spot with the minimum size passes a repeated verification.

Further optionally, as shown in FIG. 3c, the apparatus further includes a pre-processing module 306, where the pre-processing module 306 is configured to: control the alignment mechanism to place the lens to be assembled at a specified position of an optical component to be assembled, to obtain the optical module to be aligned; and control a power supply component to supply power to an internal light source device of the optical module to be aligned or an external light source device located on an object side of the optical module to be aligned, so that the optical module to be aligned images.

In the present embodiment, in the present disclosure, during the process of assembling the optical module, when the optical module to be aligned images, the alignment mechanism clamping the lens to be assembled is controlled to continuously move to find the imaged light spot with the minimum size, the optimal position of the alignment mechanism is determined based on at least two light spots before the light spot with the minimum size and at least two light spots thereafter, and the lens to be assembled is adjusted to the optimal position. Thereby, the search for the optimal position of the lens to be assembled is transformed into the search for the light spot with the minimum size imaged by the optical module to be assembled, which reduces the alignment difficulty of the lens to be assembled and improves the assembly accuracy of the optical module.

It should be noted that the expressions herein of "first", "second", etc. are intended to distinguish between different messages, devices, modules, etc., and are not intended to represent a sequential order, nor is it intended to limit that "first" and "second" are of different types.

It is also to be noted that terms "include", "contain" or any other variants thereof are intended to include nonexclusive inclusions, thereby ensuring that a commodity or system including a series of elements not only includes those elements but also includes other elements which are not clearly listed or further includes elements intrinsic to the commodity or the system. Under the condition of no more restrictions, an element defined by statement "including a/an" does not exclude existence of another element which is the same in a commodity or system including the element.

The above is only the embodiment of the present disclosure and not intended to limit the present disclosure. Those skilled in the art may make various modifications and variations to the present disclosure. Any modifications, equivalent replacements, improvements and the like made within the spirit and principle of the present disclosure shall fall within the scope of the claims of the present disclosure.

What is claimed is:

1. A method of optical module assembly, comprising:
when an optical module to be aligned images, controlling an alignment assembly clamping a lens to be assembled to move in a set direction by a set movement step;
when the alignment assembly moves each time, collecting, by an image acquisition assembly, light spots imaged by the optical module to be aligned sequentially, and selecting a light spot with a minimum size from the collected light spots;
determining an optimal position of the alignment assembly according to at least two light spots before the light spot with the minimum size and at least two light spots thereafter; and
controlling the alignment assembly to move to the optimal position to align the lens to be assembled;
wherein the selecting a light spot with a minimum size from the collected light spots comprises:
if sizes of a first number of light spots before a first light spot are all greater than a size of the first light spot, and if sizes of a second number of light spots after the first light spot are all less than the size of the first light spot, determining that the first light spot is the light spot with the minimum size.

2. The method according to claim 1, wherein the determining an optimal position of the alignment assembly according to at least two light spots before the light spot with the minimum size and at least two light spots thereafter comprises:
establishing a coordinate system by taking a movement position of the alignment assembly as a x-coordinate, and taking a size of the collected light spot as a y-coordinate;
fitting a first straight line in the coordinate system according to the at least two light spots before the light spot with the minimum size and movement positions of the alignment assembly when collecting the at least two light spots before the light spot with the minimum size, and fitting a second straight line in the coordinate system according to the at least two light spots thereafter and movement positions of the alignment assembly when collecting the at least two light spots thereafter; and
calculating an intersection point of the first straight line and the second straight line, and taking a value of the x-coordinate of the intersection point as the optimal position of the alignment assembly.

3. The method according to claim 1, wherein the controlling an alignment assembly clamping a lens to be assembled to move in a set direction by a set movement step further comprises:
controlling the alignment assembly to move from a beginning or an ending of an assembly area corresponding to the lens to be assembled in the set direction by the set movement step.

4. The method according to claim 1, wherein before the determining an optimal position of the alignment assembly according to at least two light spots before the light spot with the minimum size and at least two light spots thereafter further comprises:
taking a movement position of the alignment assembly when the light spot with the minimum size is collected as a suspicion position;
controlling the alignment assembly to move to the suspicion position and movement positions of a set number before and after the suspicion position, and collecting, by the image acquisition assembly, light spots imaged by the optical module to be aligned when the alignment assembly moves each time sequentially; and
if in the light spots imaged by the optical module to be aligned when the alignment assembly moves each time, the collected light spot is with the minimum size when the alignment assembly moves to the suspicion position, determining that the light spot with the minimum size passes a repeated verification.

5. The method according to claim 1, wherein before the optical module to be aligned imaging further comprises:
controlling the alignment assembly to place the lens to be assembled at a specified position of an optical component to be assembled, to obtain the optical module to be aligned; and
controlling a power supply component to supply power to an internal light source device of the optical module to be aligned or an external light source device located on an object side of the optical module to be aligned, so that the optical module to be aligned images.

6. An apparatus of optical module assembly, comprising:
a memory storing instructions; and
a processor configured to execute the instructions to:
control an alignment assembly clamping a lens to be assembled to move in a set direction by a movement step when an optical module to be aligned images;
when the alignment assembly moves each time, collect light spots imaged by the optical module to be aligned sequentially, and select a light spot with a minimum size from the collected light spots;
determine an optimal position of the alignment assembly according to at least two light spots before the light spot with the minimum size and at least two light spots thereafter; and
to control the alignment assembly to move to the optimal position to align the lens to be assembled;
wherein the apparatus is specifically configured to:
if sizes of a first number of light spots before a first light spot are all greater than a size of the first light spot, and if sizes of a second number of light spots after the first light spot are all less than the size of the first light spot, determine that the first light spot is the light spot with the minimum size.

7. The apparatus according to claim 6, wherein the apparatus is specifically configured to:
establish a coordinate system by taking a movement position of the alignment assembly as a x-coordinate, and taking a size of the collected light spot as a y-coordinate;
fit a first straight line in the coordinate system according to the at least two light spots before the light spot with the minimum size and movement positions of the alignment assembly when collecting the at least two light spots before the light spot with the minimum size, and fit a second straight line in the coordinate system according to the at least two light spots thereafter and movement positions of the alignment assembly when collecting the at least two light spots thereafter; and
calculate an intersection point of the first straight line and the second straight line, and take a value of the x-coordinate of the intersection point as the optimal position of the alignment assembly.

8. The apparatus according to claim 6, wherein the apparatus is further configured to:
take a movement position of the alignment assembly when the light spot with the minimum size is collected as a suspicion position;
control the alignment assembly to move to the suspicion position and movement positions of a set number before and after the suspicion position, and collecting light spots imaged by the optical module to be aligned when the alignment assembly moves each time sequentially; and
if in the light spots imaged by the optical module to be aligned when the alignment assembly moves each time, the collected light spot is with the minimum size when the alignment assembly moves to the suspicion position, determine that the light spot with the minimum size passes a repeated verification.

9. The apparatus according to claim 6, wherein the apparatus is further configured to:
control the alignment assembly to place the lens to be assembled at a specified position of an optical component to be assembled, to obtain the optical module to be aligned; and
control a power supply component to supply power to an internal light source device of the optical module to be aligned or an external light source device located on an object side of the optical module to be aligned, so that the optical module to be aligned images.

* * * * *